(12) United States Patent
Spence

(10) Patent No.: US 6,549,986 B1
(45) Date of Patent: Apr. 15, 2003

(54) LOW POWER INSTRUCTION CACHE

(75) Inventor: John R. Spence, Villa Park, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 24 days.

(21) Appl. No.: 09/598,063

(22) Filed: Jun. 20, 2000

(51) Int. Cl.⁷ .............................................. G06F 12/02
(52) U.S. Cl. ....................................................... 711/125
(58) Field of Search .............................. 711/118, 125, 711/167; 713/300, 320, 324

(56) References Cited

U.S. PATENT DOCUMENTS

| | | | |
|---|---|---|---|
| 5,550,774 A | * | 8/1996 | Brauer et al. .......... 365/189.02 |
| 5,727,180 A | * | 3/1998 | Davis et al. ................. 395/427 |
| 5,860,106 A | * | 1/1999 | Domen et al. ............... 711/137 |
| 6,070,234 A | * | 5/2000 | Shimazaki et al. .......... 711/167 |
| 6,279,063 B1 | * | 8/2001 | Kawasaki et al. ........... 710/110 |
| 6,295,218 B1 | * | 9/2001 | Osada et al. .................. 365/49 |

* cited by examiner

Primary Examiner—Kevin L. Ellis
(74) Attorney, Agent, or Firm—Farjami & Farjami LLP

(57) ABSTRACT

A low power instruction cache is disclosed. There are a number of tag memory banks. Each tag memory bank is associated with a unique instruction cache. Each tag memory bank has a number of tag memory rows and each tag memory row has a number of tag memory cells. Certain upper bits of a program counter are compared to a tag stored in one row of a tag memory bank. If there is a match between the certain upper bits of the program counter and the tag, a hit signal is generated. The hit signal indicates that the tag memory bank containing the matched row (i.e. the matched tag) is associated with the instruction cache having a desired instruction. The desired instruction is then read from the instruction cache associated with the tag memory bank corresponding to the generated hit signal. Thus, instead of reading one instruction from each of the instruction caches and then eliminating all but one of the read instructions, only the desired instruction from a single instruction cache is read. As such, a large amount of power is saved.

16 Claims, 4 Drawing Sheets

LOW POWER INSTRUCTION CACHE

FIELD OF THE INVENTION

The present invention is generally in the field of processors. More specifically, the invention is in the field of cache memories.

BACKGROUND ART

As is generally known, computer programs continue to increase in size. As computer programs grow in size, the memory requirements of the computer and various memory devices also increase. However, as the size of a program currently residing in the computer's main memory gets larger, the speed at which the processor executes tasks begins to decrease. This results from the constant fetching of instructions from the main memory of the computer into the processor (also referred to as a "Central Processing Unit" or "CPU"). The larger the program currently being used, the more often instructions must be fetched. This fetching process requires a certain number of clock phases. Therefore, the more often instructions have to be fetched from the main memory, the less time the processor has available to decode and execute those instructions and the slower the speed at which the processor can finish tasks.

Thus, it is desirable to set aside in a local memory, i.e. a memory requiring less access time than the main memory, a limited number of program instructions that the processor may want to fetch. An instruction cache is such a local memory. An instruction cache is a relatively small memory module where a limited number of program instructions may be stored.

The processor performs constant checks to determine whether instructions stored in the main memory required by the processor are already resident in the instruction cache. If they are already resident in the instruction cache, the instruction fetch step is performed by referring to the instruction cache, since there is no need to go to the main memory to find what is already in the instruction cache.

Thus, the processor must be able to determine if an instruction to be fetched from the main memory is already resident in the instruction cache. The processor's program counter contains the address of an instruction needed by the processor. One way to determine if an instruction is already resident in the instruction cache is to keep track of the addresses of the instructions when they are first brought into the instruction cache from the main memory. To do this, copies of certain upper bits of the main memory addresses are stored in a tag memory bank where each entry in the tag memory bank is referred to as a "tag." As an example, the upper 23 bits of a 32-bit main memory address comprise the tag. These upper 23 bits of the 32-bit main memory address are referred to as the "tag."

When the processor wishes to determine whether a particular instruction is resident in the instruction cache, the address of the instruction is sent from the program counter across the address bus to the instruction cache and the tag memory bank. In the present example, the 23-bit tags within the tag memory bank and the 32-bit wide instructions in the instruction cache are read. The upper 23 bits of address of the instruction contained in the program counter is then compared with a tag in the tag memory. If there is a match, also referred to as a "hit," the instruction is already resident in the instruction cache, and it is not necessary to fetch the instruction from the main memory. If there is no match, also referred to as a "miss," the instruction must be fetched from the main memory at the address contained in the program counter.

A "set-associative" cache consists of multiple sets, each set consisting of an instruction cache and a tag memory bank. A set-associative cache decreases the number of instances where the program is required to return to the main memory. This is because a number of instruction caches hold instructions corresponding to a number of different segments of a computer program. Thus, the speed at which the processor executes a program increases since there is a greater chance that the processor can find a desired instruction in the set-associative cache as opposed to the main memory.

A set-associative cache also has disadvantages. Because there are multiple tag memory banks, each tag memory bank must be accessed to determine if a tag which is resident in that bank matches the corresponding upper bits contained in the program counter. In the present example, each tag memory bank must be accessed to determine whether it has a tag which matches the upper 23 bits in the program counter. Power is consumed each time a tag and an instruction are read from a tag memory bank and an instruction cache, respectively. For example, if the set-associative cache has four memory banks and four instruction caches, each time the processor accesses the set-associative cache, four instructions and four tags are read. Thereafter, at most a single tag is matched and an instruction corresponding to the matched tag is identified as the desired instruction.

In a set-associative cache discussed above, power consumed is proportional to the number of tags read, multiplied by the width of a tag in bits, plus the number of instructions read, multiplied by the width of an instruction in bits. The number of instructions and tags are, in turn, equal to the number of sets of instruction caches and tag memory banks. In the above example, the width of a tag is 23 bits, the width of an instruction is 32 bits, and there are 4 sets of instruction caches and tag memory banks. As such, the power consumption for each set-associative cache read operation is proportional to:

$$(4 \text{ instructions} \times 32 \text{ bits}) + (4 \text{ tags} \times 23 \text{ bits}).$$

Thus, although a set-associative cache increases the speed with which the processor executes tasks, there is a corresponding increase in power consumption resulting from the reading of the additional tags and instructions from the additional sets of instruction caches and tag memory banks. Using the example above, it can be seen that in addition to the power consumed from reading and comparing the four tags, power is consumed reading four instructions, although at most only one of the instructions will be the desired instruction.

Thus, it can be seen that there is a need in the art for a method to implement a set-associative cache which maintains the advantages discussed above, such as increased operating speed, while at the same time reducing the additional power consumption inherent in a set-associative cache.

SUMMARY OF THE INVENTION

The present invention is a low power instruction cache. According to the invention, there are a number of tag memory banks. Each tag memory bank is associated with a unique instruction cache. Each tag memory bank has a number of tag memory rows and each tag memory row has a number of tag memory cells. The invention compares certain upper bits of a program counter to a tag stored in one row of a tag memory bank. If there is a match between the certain upper bits of the program counter and the tag, a hit signal is generated. The hit signal indicates that the tag memory bank containing the matched row (i.e. the matched tag) is associated with the instruction cache having a desired instruction. The desired instruction is then read from the instruction cache associated with the tag memory bank corresponding to the generated hit signal.

Utilizing the present invention, instead of reading one instruction from each of the instruction caches and then eliminating all but one of the read instructions, only the desired instruction from a single instruction cache is read. As such, a large amount of power is saved. In one embodiment of the invention, there are four tag memory banks, each having 32 tag memory rows, and each row having 23 tag memory cells. There are also four instruction caches, each associated with one of the four tag memory banks. The upper 23 bits in the program counter is compared with each of the 23 bits in a particular tag memory row in each of the four tag memory banks. When there is a match between the upper 23 bits in the program counter and the 23 bits in a particular tag memory row, a hit signal is generated corresponding to the particular tag memory bank containing the matched tag memory row. Thereafter, a desired instruction is read only from the particular instruction cache associated with the tag memory bank corresponding to the generated hit signal.

DETAILED DESCRIPTION OF THE INVENTION

The present invention is a low power instruction cache. The following description contains specific information pertaining to different types of configurations, components and implementations of the invention. One skilled in the art will recognize that the present invention may be practiced with configurations, components and implementations different from those specifically discussed in the present application. Moreover, some of the specific details of the invention are not discussed in order to not obscure the invention. The specific details not discussed in the present application are within the knowledge of a person of ordinary skills in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1A:
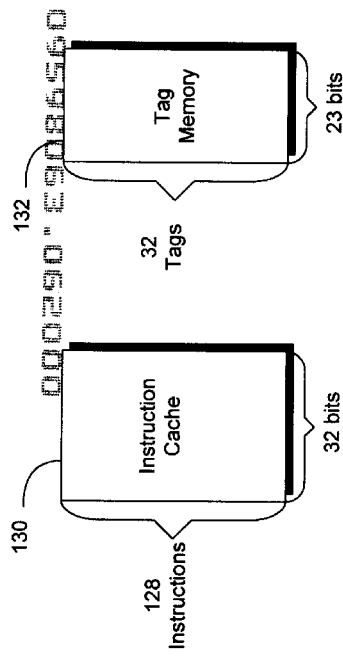
FIG. 1A illustrates an instruction cache and a tag memory bank.

FIG. 1A is used to explain some of the terminology used in the present invention. FIG. 1A shows instruction cache 130 which has 128 locations available to store 32-bit wide instructions. The 128 locations in instruction cache 130 can be addressed using the seven bits in bit locations 0 through 6 of instruction memory address 100 shown in FIG. 1B. These seven bits are referred to as instruction address 138. The upper 23 bits of instruction memory address 100 occupying bit positions 7 through 29 comprise a "tag" which is referred to by numeral 134 in FIG. 1B. Each tag is stored in an assigned location in tag memory 132 in FIG. 1A. In the present example, tag memory 132 has 32 locations. Each one of the 32 tags can be addressed using the five bits in bit locations 2 through 6 of instruction memory address 100. These five bits are referred to as tag address 136. Each of the 32 locations of tag memory 132 can store one tag. Instruction cache 130 and tag memory 132 together make up one set within a set-associative cache.

Figure 1B:
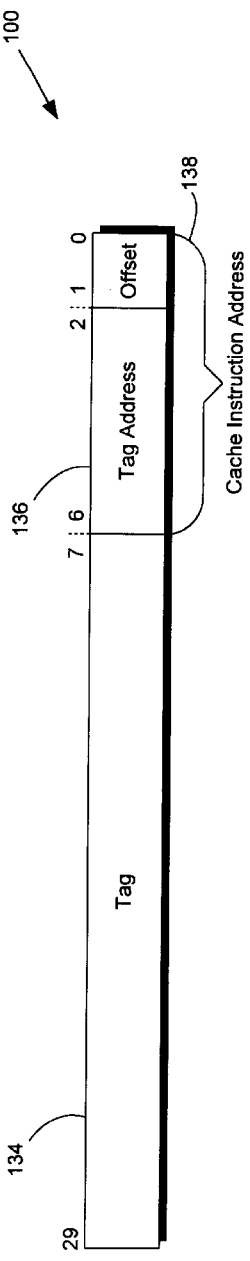
FIG. 1B illustrates an instruction memory address.
Figure 1C:
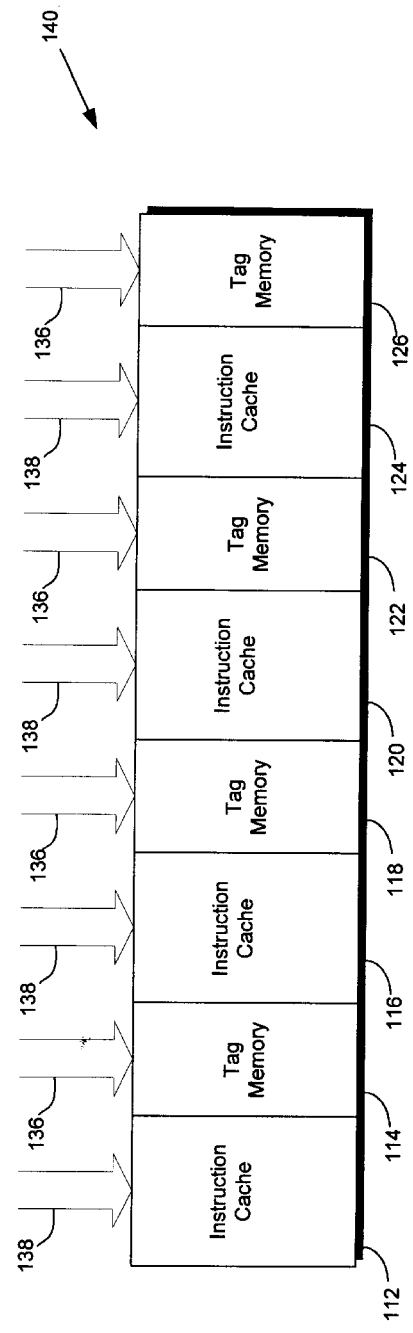
FIG. 1C illustrates a block diagram of a set-associative cache.

FIG. 1C shows a block diagram of one example of a set-associative cache. In this example, set-associative cache 140 is comprised of four instruction caches. Each instruction cache is identical to instruction cache 130 shown in FIG. 1A. These four instruction caches are instruction cache 112, instruction cache 116, instruction cache 120 and instruction cache 124.

FIG. 1C also shows four tag memory banks. Each tag memory bank is identical to tag memory 132 shown in FIG. 1A. These four tag memory banks are tag memory bank 114, tag memory bank 118, tag memory bank 122 and tag memory bank 126.

Although not shown in any of the Figures, an address bus allows a program counter to communicate with instruction caches 112, 116, 120 and 124 and tag memory banks 114, 118, 122 and 126. Instruction caches 112, 116, 120 and 124 also communicate with an instruction register which is not shown in any of the Figures. Also not shown in any of the Figures is a cache controller which controls the cache operations.

By way of background, instruction caches 112, 116, 120 and 124, and tag memory banks 114, 118, 122, and 126 are initially "built up" as follows. The program counter contains the address of the instruction needed by the processor. This address shall be referred to as the "main memory instruction address." The main memory instruction address contained in the program counter is bussed into the cache. A copy of the upper 23 bits of the main memory instruction address is stored in a tag memory location in one of tag memory banks 114, 118, 122 or 126.

As discussed above, the tag memory location where the copy of the upper 23 bits is stored corresponds to a unique five-bit pattern in tag address 136 in FIG. 1B. These 5 bits can be decoded to access any one of the 32 tag memory locations in tag memory banks 114, 118, 122 or 126 ($2^5$=32). The arrows at the top of the tag memory banks in FIG. 1C referred to by numeral 136 represent the five bits of tag address 136 in FIG. 1B being used to select one out of the 32 tag locations within each tag memory bank. The tag memory bank decoder is not shown in any of the Figures.

Continuing with the above discussion regarding how the instruction caches and the tag memory banks are built up, each instruction for which a tag is stored in a tag memory bank is stored in one of the locations in instruction caches 112, 116, 120 or 124. As discussed above, the instruction cache location where the instruction is stored is determined by the 7 bits of instruction memory address 100 referred to by numeral 138 in FIG. 1B. These 7 bits can be decoded to address any one of the 128 instruction cache locations in each of instruction caches 112, 116, 120 and 124 ($2^7$=128). The arrows at the top of the instruction caches in FIG. 1C referred to by numeral 138 represent the seven bits of instruction address 138 in FIG. 1B being used to select one out of 128 instruction locations within the instruction cache. The instruction cache decoder is not shown in any of the Figures. Thus, instruction caches 112, 116, 120 and 124, and tag memory banks 114, 118, 122 and 126 are initially built up as explained above.

As discussed above, in the present example, set-associative cache 140 has four instruction caches, each instruction cache capable of storing 128 instructions, each instruction being 32-bit wide. In the present example, set-associative cache 140 also has four tag memory banks, each tag memory bank capable of storing 32 tags, where each tag has 23 bits. The 23 bits comprising a tag are also called the "tag bits" in the present application.

In the exemplary set-associative cache 140 shown in FIG. 1C, the operations discussed below take place during two clock phases. Referring to the timing diagram in FIG. 2, these two clock phases are clock phase 1, also referred to as C1, and clock phase 2, also referred to as C2. During a first C1 referred to by numeral 202 in FIG. 2, the main memory instruction address is sent across the address bus from the program counter to the set-associative cache and the five bits of tag address 136 are decoded to determine the location in each of tag memory banks 114, 118, 122 and 126 that corresponds to the unique 5-bit pattern of tag address 136.

Figure 2:
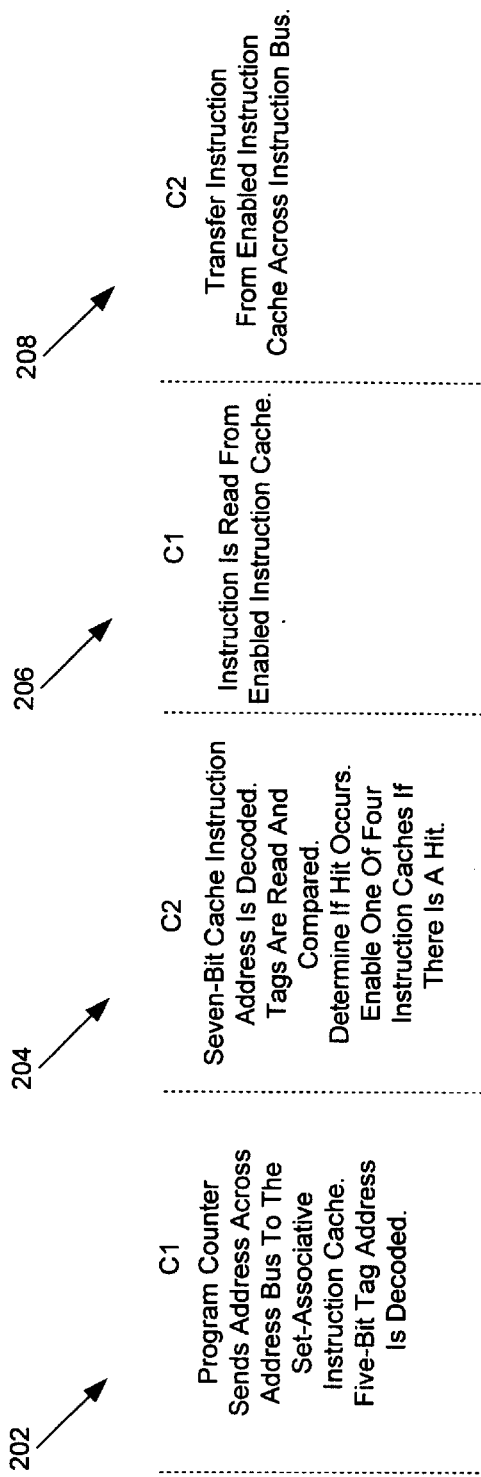
FIG. 2 illustrates a timing diagram of cache operations which occur during two clock phases.

During a first C2 referred to by numeral 204 in FIG. 2, the seven bits corresponding to the cache instruction address, referred to by numeral 138 in FIG. 1B, are decoded to determine a respective location in each instruction cache 112, 116, 120, and 124 that corresponds to the unique 7-bit pattern. Also during this first C2, a respective tag from each of the four tag memory banks is read and each tag is compared to the upper 23 bits of the main memory instruction address. The respective tag read from each of the four tag memory banks corresponds to the decoded five-bit tag address 136. If the upper 23 bits of the main memory instruction address is identical to the tag read from one of the four tag memory banks, then the instruction cache corresponding to that tag memory bank contains the desired instruction. As such, the instruction cache containing the desired instruction is enabled to send the desired instruction to the instruction register.

During a second C1 referred to by numeral 206 in FIG. 2, the desired instruction is read from the enabled instruction cache. During a second C2 referred to by numeral 208 in FIG. 2, the desired instruction is sent to the instruction register.

It can be seen from the timing diagram of FIG. 2 that, unlike the set-associate instruction cache discussed in the background art section of the present application, the invention's low power set-associative instruction cache does not read all the four instructions in instruction caches 112, 116, 120 and 124. Only if one of the tags read from tag memory banks 114, 118, 122 and 126 is identical to the upper 23 bits of the main memory instruction address contained in the program counter a corresponding instruction cache will be enabled and the desired instruction will be read from the enabled instruction cache. Thus, only one instruction cache is enabled and only one instruction is read. Therefore, there is significantly less power consumption. In other words, instead of the power consumed being proportional to (4 instructions×32 bits)+(4 tags×23 bits), the consumed power is proportional to (1 instruction×32 bits)+(4 tags×23 bits).

Figure 3:
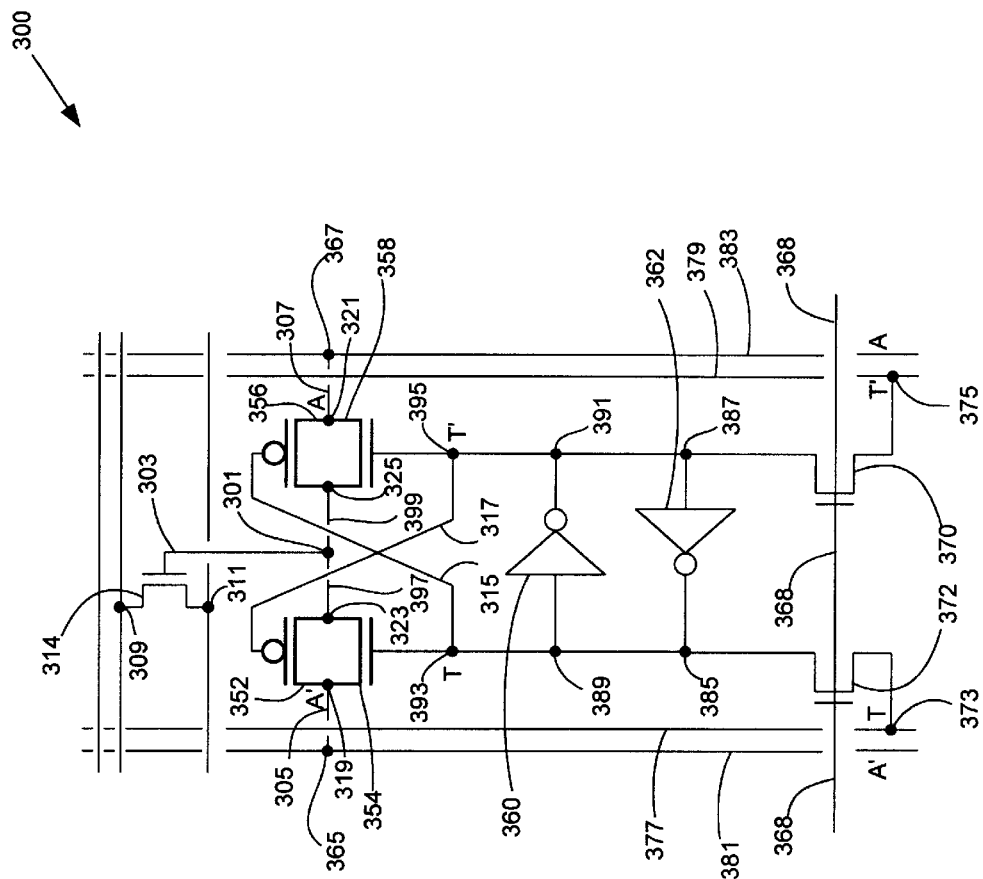
FIG. 3 illustrates a tag memory cell.

Turning to the invention's logic and circuit diagram, reference is made to FIG. 3. FIG. 3 shows a schematic diagram of memory cell 300. Memory cell 300 represents just one of many such memory cells that are located inside each tag memory bank, such as tag memory banks 114, 118, 122, and 126. In the present example, in each tag memory bank there is an array of memory cells similar to memory cell 300. The array consists of 32 tag memory rows with 23 memory cells in each tag memory row. In other words, there are 32 tag memory locations within a tag memory bank, each containing a 23-bit wide tag.

Line 377 and line 379 are connected to memory cell 300 at node 373 and node 375, respectively. Lines 381 and 383 are connected to memory cell 300 at node 365 and node 367, respectively. The wordline, referred to in FIG. 3 by numeral 368, is connected to the gates of NFET 370 and NFET 372. The drain of NFET 370 is connected to node 387 and the source of NFET 370 is connected to node 375. The drain of NFET 372 is connected to node 385 and the source of NFET 370 is connected to node 373. Inverter 360 has an input connected to node 389 and an output connected to node 391. Inverter 362 has an input connected to node 387 and an output connected to node 385.

The gate of NFET 354 is connected to node 393. The source of NFET 354 at node 319 is connected to node 365 through line 305 and the drain of NFET 354 at node 323 is connected to node 301 through line 397. The gate of NFET 358 is connected to node 395. The source of NFET 358 at node 325 is connected to node 301 through line 399 and the drain of NFET 358 at node 321 is connected to node 367 through line 307

The gate of PFET 352 is connected to node 395 through line 317. The source of PFET 352 at node 323 is connected to node 301 through line 397 and the drain of PFET 352 at node 319 is connected to node 365 through line 305. The gate of PFET 356 is connected to node 393 through line 315. The source of PFET 356 at node 321 is connected to node 367 through line 307 and the drain of PFET 356 at node 325 is connected to node 301 through line 399. The gate of NFET 314 is connected to node 301 through line 303. The drain of NFET 314 is connected to node 311 and the source of NFET 314 is connected to node 309.

The 23 upper bits of the of the main memory instruction address are sent from the program counter across the address bus. There are two address lines for memory cell 300. One address line, referred to by numeral 383, carries an address bit referred to as bit A to node 367 and through line 307 to the drain of NFET 358 and the source of PFET 356, which are connected together at node 321. The other address line, referred to by numeral 381, carries an address bit referred to as bit A', i.e. an inverted bit A, to node 365 and through line 305 to the source of NFET 354 and the drain of PFET 352, which are connected together at node 319.

The tag bits are sent across bus lines to memory cell 300. There are two bus lines for memory cell 300. The first bus line, referred to by numeral 377, carries a tag bit, referred to as bit T, to node 373. The second bus line, referred to by numeral 379, carries a tag bit, referred to as bit T', to node 375.

Wordline 368 enables a particular tag memory row of 23 memory cells to receive a 23 bit tag. One tag memory row out of 32 tag memory rows is enabled by the wordline to receive a 23 bit tag. When the wordline for the tag memory row containing memory cell 300 is high, NFET 370 and NFET 372 turn on, allowing the tag bits to enter memory cell 300 through bus lines 377 and 379.

The tag bit T is input to inverter 360 at node 389. As such, the output of inverter 360 at node 391 is an inverted bit T, i.e., bit T'. Bit T' is input to inverter 362 at node 387. Thus, at the output of inverter 362 at node 385 is an inverted bit T', i.e., bit T.

NFET 354, NFET 358, PFET 352 and PFET 356 are connected in a manner to provide an "Exclusive OR" (or "XOR") output at node 301 of input bits A and T. Bit T is input to the gate of NFET 354 at node 393. At the same time bit T is input to the gate of PFET 356 through line 315. Bit T' is input to the gate of NFET 358 at node 395. At the same time bit T' is input to the gate of PFET 352 through line 317.

If bit T is a logical "1", bit T' will be a logical "0". Thus, NFET 354 turns on as a result of bit T being a "1" and NFET 358 is off as a result of bit T' being a "0". PFET 356 is off as a result of bit T being a "1" and PFET 352 turns on as a result of bit T' being a "0". Thus, since both NFET 354 and PFET 352 are on, bit A' at node 319 is allowed to pass through NFET 354 and PFET 352 to node 301 through line 397. Thus, if bit T is a logical "1", the output of the XOR at node 301 is the same as bit A'.

If bit T is a "0", bit T' will be a "1". Thus, NFET 354 is off as a result of bit T being a "0" and NFET 358 turns on as a result of bit T' being a "1". PFET 356 turns on as a result of bit T being a "0" and PFET 352 is off as a result of bit T' being a "1".

Thus, since both NFET 358 and PFET 356 are on, bit A at node 321 is allowed to pass through NFET 358 and PFET 356 to node 301 through line 399. Thus, if bit T is a logical "0", the output of the XOR at node 301 is the same as bit A.

Thus, it is seen that PFET 352, NFET 354, PFET 356 and NFET 358 operate as an XOR gate as shown in the following table:

| A | T | Output |
|---|---|--------|
| 0 | 0 | 0 (A)  |
| 0 | 1 | 1 (A') |
| 1 | 0 | 1 (A)  |
| 1 | 1 | 0 (A') |

Thus, it is seen that when the address bit in memory cell 300 is the same as the tag memory cell 300, i.e., both are a "0" or both are a "1", the output of the XOR at node 301 will be a "0". An Exclusive OR ("XOR") gate is an example of a comparator since the output of the XOR gate indicates whether its two inputs are equal. An XOR gate is also referred to as a comparator in the present application.

The output of the XOR at node 301 is connected to the gate of NFET 314 through line 303. If the output at node 301 is a "1", NFET 314 turns on. When the output at node 301 is a "0", NFET 314 is off.

Figure 4:
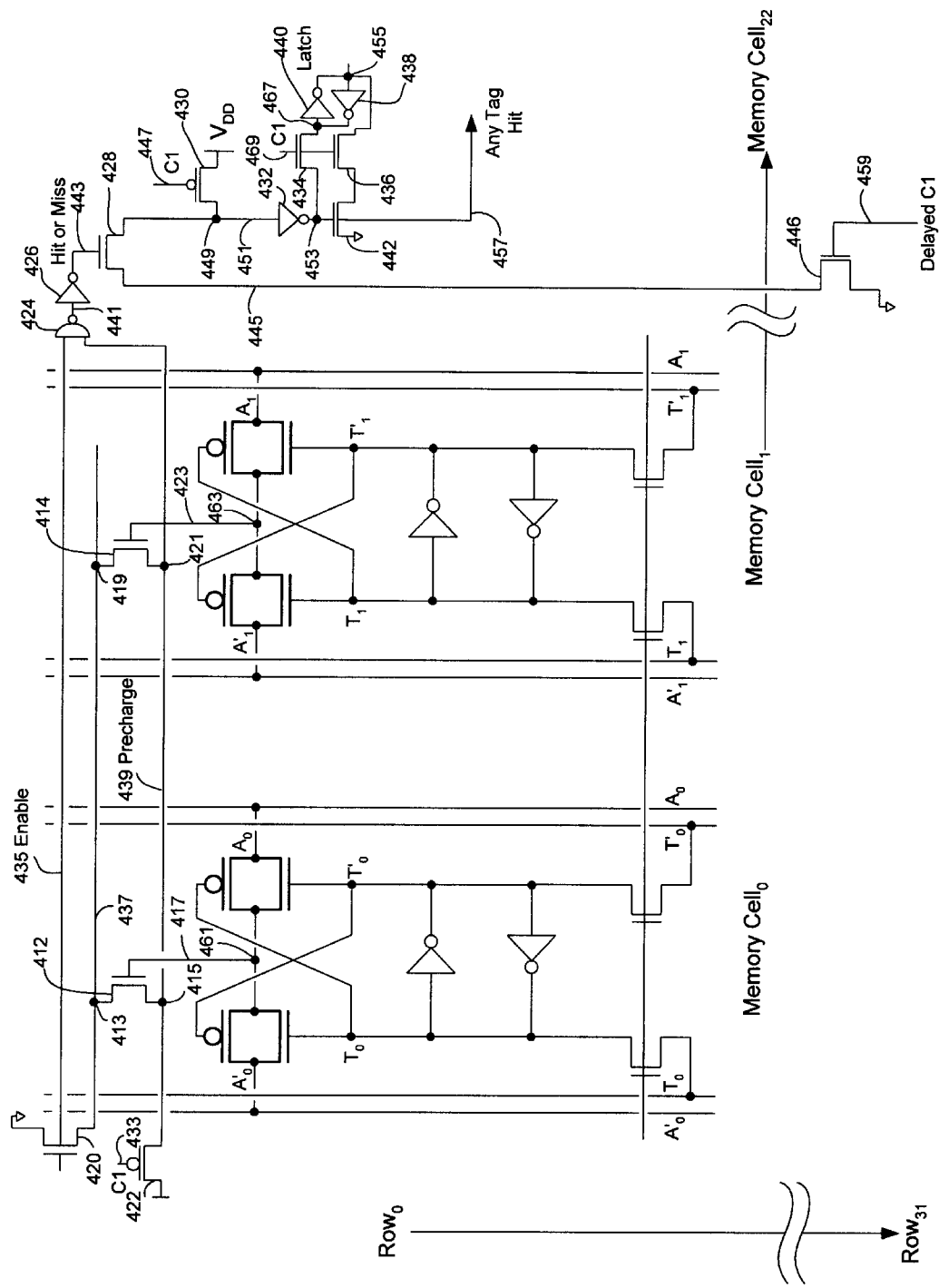
FIG. 4 illustrates two tag memory cells within a tag memory row of a tag memory bank.

FIG. 4 shows a schematic diagram of two memory cells, memory cell$_0$ and memory cell$_1$, which are connected to bus lines and address lines, along with additional circuits which will be described below. Both memory cell$_0$ and memory cell$_1$ are located in tag memory row$_0$ which is the first tag memory row out of the total of 32 tag memory rows in the tag memory bank.

Memory cell$_0$ and memory cell$_1$ represent two memory cells that are part of an array of memory cells located inside the tag memory banks. Memory cell$_0$ and memory cell$_1$ are identical in form and function to memory cell 300 in FIG. 3. As discussed above, in the present example the array would consist of 32 tag memory rows of memory cells with 23 memory cells in each row. This corresponds to the 32 tag memory locations within a tag memory, each containing 23 tag bits which make up an individual tag.

Node 461 is the output of the XOR within memory cell$_0$. Node 461 is connected to the gate of NFET 412 through line 417. The drain of NFET 412 is connected to precharge line 439 at node 415 and the source of NFET 412 is connected to line 437 at node 413.

Node 463 is the output of the XOR within memory cell$_1$. Node 463 is connected to the gate of NFET 414 through line 423. The drain of NFET 414 is connected to precharge line 439 at node 421 and the source of NFET 414 is connected to line 437 at node 419.

The source of NFET 420 is connected to ground and the drain of NFET 420 is connected through line 437 to the source of NFET 412 at node 413 and also to the source of NFET 414 at node 419. The gate of NFET 420 is connected to and driven by enable line 435.

The source of PFET 422 is connected to $V_{DD}$ and the drain of PFET 422 is connected through line 439 to the drain of NFET 412 at node 415 and to the drain of NFET 414 at node 421 and also to a first input of NAND gate 424. The gate of PFET 422 is connected to line 433.

A first input of NAND gate 424 is connected through precharge line 439 to the drain of NFET 414 at node 421 and to the drain of NFET 412 at node 415 and also to the drain of PFET 422. A second input of NAND gate 424 is connected to enable line 435. The output of NAND gate 424 is connected to the input of inverter 426 through line 441. The output of inverter 426 is connected to the gate of NFET 428 through line 443.

The drain of NFET 428 is connected through line 451 to the drain of PFET 430 at node 449. The drain of NFET 428 is also connected through line 451 to the input of inverter 432 at node 449. The source of NFET 428 is connected through line 445 to the drain of NFET 446. The gate of PFET 430 is connected to line 447. The source of PFET 430 is connected to $V_{DD}$. The gate of NFET 446 is connected to line 459 and the source of NFET 446 is connected to ground.

The output of inverter 432 is connected to the gate of NFET 442 at node 453 and to the source of NFET 434 at node 453. The drain of NFET 442 is connected to the source of NFET 436 while the source of NFET 442 is connected to ground. The drain of NFET 436 is connected to the output of inverter 440 and the input of inverter 438 at node 455. The gate of NFET 436 is connected to line 469.

The drain of NFET 434 is connected to the input of inverter 440 and also to the output of inverter 438 at node 467. The gate of NFET 434 is connected to line 469. The output of inverter 440 is connected to the input of inverter 438 at node 455.

During every C2 phase, i.e. when C2 is high and C1 is low, PFET 422 turns on and line 439 will be pre-charged, i.e. line 439 will be high. Thus there will be a logical "1" at the first input of NAND gate 424 through precharge line 439 when C2 is high. When C1 is high, NFET 420 turns on only if the five bit pattern in tag address 136 identifies tag memory row$_0$ as the selected tag memory row. If tag memory row$_0$ is selected by the five bit pattern in tag address 136, enable line 435 is high when C1 is high and there is a "1" on the second input of NAND gate 424. Thus, NAND gate 424 is enabled to pass to the output of inverter 426 whatever state exists on precharge line 439 when C1 is high. The output of NAND gate 424 is inverted at inverter 426. Thus, when C1 is high, if precharge line 439 is low, the output of inverter 426 will be a "0". If precharge line 439 is high, the output of inverter 426 will be a "1".

Output of the XOR within memory cell$_0$ at node 461 is connected to the gate of NFET 412 and the output of the XOR within memory cell$_1$ at node 463 is connected to the gate of NFET 414. NFET 412 and NFET 414 are connected in a manner to provide a "dynamic NOR gate". There would be one respective NFET in the dynamic NOR gate for each of the remaining 21 memory cells of tag memory row$_0$. The remaining 21 memory cells in tag memory row$_0$ are not shown in FIG. 4. The dynamic NOR gate operates as described below.

Each memory cell compares one tag bit and one address bit. If the tag bit and the address bit are the same, i.e., either both a "0" or both a "1", the output of the XOR within the memory cell will be a "0". If the tag bit and the address bit are different, the output of the XOR within the memory cell will be a "1".

It is recalled that NFET 420 is turned on when C1 is high and when tag memory row$_0$ is selected. As such, line 437 will be shorted to ground and a "0" will be present on line 437 when C1 is high and tag memory row$_0$ is selected. If either the output of the XOR in memory cell$_0$ at node 461 or the output of the XOR in memory cell$_1$ at node 463 is a "1", then their respective NFET in the dynamic NOR gate turns on. When tag memory row$_0$ is selected and if either NFET 412 or NFET 414 is turned on, precharge line 439 will short to line 437 and precharge line 439 will discharge. Accordingly, there will also be a "0" at the first input to NAND gate 424 and a "1" at the output of NAND gate 424.

Thus, there will be a "1" on the output of NAND gate 424 when at least one bit in the 23 upper bits of the main memory instruction address is different from the corresponding bit in the 23-bit tag. This "1" is then at the input of inverter 426 resulting in a "0" at the output of inverter 426. This "0" at the output of inverter 426 corresponds to the condition when the upper 23 bits of the main memory instruction address are not identical to the 23 bits of the tag. This condition is referred to as a "miss".

If both the output of the XOR in memory cell$_0$ at node 461 and the output of the XOR in memory cell$_1$ at node 463 are a "0", then their respective NFET in the dynamic NOR gate is off. Thus, precharge line 439 would not be shorted to line 437 and therefore when tag memory row$_0$ is selected and C1 transitions from low to high, precharge line 439 and the first input of NAND gate 424 will still be a "1" and the output of NAND 424 will be a "0". This "0" which is at the input of inverter 426 results in a "1" at the output of inverter 426. This "1" at the output of inverter 426 corresponds to the condition when the upper 23 bits of the main memory instruction address match the 23 bits of the tag. This condition is referred to as a "hit".

It can be seen that NAND gate 424 and inverter 426 function together as an AND gate. The output of inverter 426 is where the result of the compare operation is seen. There would be one respective NAND gate and one respective inverter for each of the remaining 31 tag memory rows in the tag memory bank. The remaining 31 tag memory rows in the tag memory bank are not shown in FIG. 4.

NFET 428 is part of another dynamic NOR gate. There would be one respective NFET such as NFET 428 for each of the remaining 31 tag memory rows in the tag memory bank. The remaining 31 tag memory rows in the tag memory bank are not shown in FIG. 4. This dynamic NOR gate operates as described below.

When C1 is low, PFET 430 turns on and line 451 will be pre-charged. As discussed above, when tag memory row$_0$ is selected and C1 transitions from low to high, the result of the compare operation will be present on the output of inverter 426. If a "0" is present on the output of inverter 426, corresponding to a miss, NFET 428 is off. Thus, there will be a "1" at the input of inverter 432 and a "0" at the output of inverter 432.

If a "1" is present on the output of inverter 426, corresponding to a hit, NFET 428 turns on. Moreover, NFET 446 turns on when C1 transitions from low to high and line 445 will be shorted to ground when C1 is high. Thus, when NFET 428 turns on and when C1 transitions from low to high, line 451 will be shorted to line 445 and will be pulled low. Thus, there will be a "0" at the input of inverter 432 and a "1" at the output of inverter 432. It is noted that the C1 input to the gate of NFET 446 must be delayed for a short time so that the output of inverter 426 has time to settle before NFET 446 turns on. As such, the "delayed C1" at the input to the gate of NFET 446 avoids a "race" condition.

NFET 434, NFET 436, NFET 442, inverter 438 and inverter 440 are connected in a manner to "latch" the hit or miss. When tag memory row$_0$ is selected and C1 transitions from low to high, line 457 will be high if there is a "1" at the output of inverter 426, corresponding to a hit condition on tag memory row$_0$ of the tag memory bank. There would be one respective line identical to line 457 for each of the remaining 31 tag memory rows in the tag memory bank. The remaining 31 tag memory rows in the tag memory bank are not shown in FIG. 4. Thus, whenever there is a hit in a selected tag memory row within the tag memory bank, the corresponding line for that tag memory row, such as line 457 for tag memory row$_0$, will be high. The 32 lines, which include line 457, are OR'ed together in a manner known in the art. When any one of the 32 inputs to the OR is a "1", the output of the OR will be a "1" (the OR gate is not shown in any of the Figures). Thus, the output of the OR will be a "1" whenever there is a hit on any one of the 32 tag memory rows of the tag memory bank. The output of this OR is referred to as "any tag hit".

When the output of the OR is a "1", there is a hit in the tag memory bank corresponding to that OR gate. In the present example, at most one of the four tag memory banks will result in a "1" in its corresponding "any tag hit" OR gate. The desired instruction is thus in the instruction cache corresponding to the tag memory bank which has a "1" at the output of its "any tag hit" OR gate.

The instruction cache containing the desired instruction is enabled to send the desired instruction to the instruction register. The desired instruction is at an address decoded from the seven bits contained in the cache instruction address 138. Thus, when there is a hit, the seven-bit address decoder for the instruction cache containing the desired instruction will be enabled. If there is a miss, the decoder for the instruction cache will be disabled.

Thus, it is seen that the invention completes the tag comparison during the first C2, referred to by numeral 204 in FIG. 2, by means of an XOR gate within the tag memory cell itself. In other words, during the first C2 the invention determines if there is a "hit", i.e. if there is a match between the upper 23 bits in the program counter and any of the 23-bit tags in one of the four memory banks. The desired instruction is located in the instruction cache associated with the particular tag memory bank containing the tag that resulted in a hit.

Unlike other set-associative caches, the invention does not read four instructions from each of the four instruction caches. Instead, only the desired instruction is read from a single instruction cache. If there is a "hit," the desired instruction is located in one of the four instruction caches. The decoder for the instruction cache corresponding to the tag memory bank where a hit has occurred is enabled. During the second C2, referred to by numeral 208 in FIG. 2, the desired instruction is sent from the enabled instruction cache to the instruction register.

As discussed above, in techniques other than the invention's technique, a total of four instructions are read during the second C1, one from each of the four instruction caches in the set-associative cache. As a result, the power consumed is expressed as:

Power (4 instructions×32 bits)+(4 tags×23 bits).

In contrast, the invention reads only one instruction during the second C1. As a result, the power consumed is expressed as:

Power (1 instruction×32 bits)+(4 tags×23 bits).

Accordingly, the invention results in a significant saving in the power consumption of the set-associative cache.

Thus, a low power instruction cache has been described. What is claimed is:

1. A method comprising steps of:
comparing in a first tag memory cell each of a first plurality of program counter bits with a respective tag bit in a first tag in a first tag memory bank and comparing in a second tag memory cell said each of said first plurality of program counter bits with a respective tag bit in a second tag in a second tag memory bank;
enabling a first instruction cache associated with said first tag memory bank when said first plurality of program counter bits match said first tag;
reading a desired instruction from said first instruction cache, said desired instruction being at an address pointed to by a second plurality of program counter bits.

2. The method of claim 1 wherein said comparing of each of said first plurality of program counter bits with said respective tag bit in said first tag is performed by a first XOR gate inside said first tag memory cell and wherein said comparing of each of said first plurality of program counter bits with said respective tag bit in said second tag is performed by a second XOR gate inside said second tag memory cell.

3. The method of claim 2 wherein said enabling step comprises logically combining an output of said first XOR gate and an output of said second XOR gate.

4. The method of claim 2 wherein said enabling step comprises NOR'ing an output of said first XOR gate and an output of said second XOR gate.

5. The method of claim 1 wherein said reading step comprises a step of loading said desired instruction into an instruction register coupled to said instruction cache.

6. A circuit comprising:
a plurality of tag memory banks;
a purality of tag memory rows in each of said plurality of tag memory banks;
a plurality of tag memory cells in each of said plurality of tag memory rows;
at least one of said plurality of tag memory cells comprising a comparator for comparing one of a plurality of program counter bits with one of a plurality of tag bits in said at least one of said plurality of tag memory cells;
an output of said comparator being used to enable one of a plurality of instruction caches.

7. The circuit of claim 6 wherein each of said plurality of tag memory banks corresponds to a unique one of said plurality of instruction caches.

8. The circuit of claim 7 wherein said one of said plurality of instruction caches is enabled when respective comparators in each of said plurality of tag memory cells of one of said plurality of tag memory rows indicate a match between each of said plurality of program counter bits and each of said plurality of tag bits.

9. The circuit of claim 8 wherein said one of said plurality of instruction caches corresponds with one of said plurality of tag memory banks and wherein said one of said plurality of tag memory banks contains said one of said plurality of tag memory rows.

10. The circuit of claim 6 wherein said comparator comprises an XOR gate.

11. The circuit of claim 6 wherein each of said plurality of tag memory cells comprises one of a plurality of comparators for comparing a respective one of said plurality of program counter bits with a respective one said plurality of tag bits.

12. The circuit of claim 11 wherein respective outputs of said plurality of comparators are logically combined to generate a hit signal for one of said plurality of tag memory banks, said hit signal indicating a match between each of said plurality of program counter bits and each of said plurality of tag bits in one of said plurality of tag memory rows in said one of said plurality of tag memory banks.

13. The circuit of claim 12 wherein respective outputs of said plurality of comparators are NOR'ed to generate said hit signal.

14. The circuit of claim 6 wherein said plurality of tag memory banks comprises four tag memory banks.

15. The circuit of claim 6 wherein said plurality of instruction caches comprises four instruction caches.

16. The circuit of claim 14 wherein said plurality of instruction caches comprises four instruction caches, each of said four instruction caches corresponding to one of said four tag memory banks.

* * * * *

UNITED STATES PATENT AND TRADEMARK OFFICE
CERTIFICATE OF CORRECTION

| | | |
|---|---|---|
| PATENT NO. | : 6,549,986 B1 | Page 1 of 1 |
| APPLICATION NO. | : 09/598063 | |
| DATED | : April 15, 2003 | |
| INVENTOR(S) | : Spence | |

It is certified that error appears in the above-identified patent and that said Letters Patent is hereby corrected as shown below:

Column 12, line 1, in Claim 6, delete "purality" and insert -- plurality --.

Column 12, line 29, in Claim 11, delete "one said" and insert -- one of said --.

Signed and Sealed this
Fourteenth Day of February, 2012

David J. Kappos
*Director of the United States Patent and Trademark Office*